United States Patent
Semmer et al.

(10) Patent No.: US 9,450,459 B2
(45) Date of Patent: Sep. 20, 2016

(54) POLE SHOE ARRANGEMENT FOR A MACHINE ELEMENT OF AN ELECTRICAL MACHINE

(71) Applicants: Silvio Semmer, Brande (DK); Xavier Tourde, Brande (DK); Adriana Cristina Urda, Odense M (DK)

(72) Inventors: Silvio Semmer, Brande (DK); Xavier Tourde, Brande (DK); Adriana Cristina Urda, Odense M (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 428 days.

(21) Appl. No.: 13/864,596

(22) Filed: Apr. 17, 2013

(65) Prior Publication Data

US 2013/0270951 A1    Oct. 17, 2013

(30) Foreign Application Priority Data

Apr. 17, 2012  (EP) .................................. 12164431
Jun. 8, 2012   (EP) .................................. 12171279
Nov. 8, 2012   (DE) ....................... 10 2012 220 382

(51) Int. Cl.
| | | |
|---|---|---|
| *H02K 1/27* | (2006.01) | |
| *H02K 1/17* | (2006.01) | |
| *H02K 15/03* | (2006.01) | |
| *H02K 1/02* | (2006.01) | |
| *H02K 7/18* | (2006.01) | |

(52) U.S. Cl.
CPC *H02K 1/17* (2013.01); *H02K 1/27* (2013.01); *H02K 1/2773* (2013.01); *H02K 1/2786* (2013.01); *H02K 15/03* (2013.01); *H02K 1/02* (2013.01); *H02K 7/1838* (2013.01); *Y02E 10/725* (2013.01); *Y10T 29/49012* (2015.01)

(58) Field of Classification Search
CPC .... H02K 1/27; H02K 1/2706; H02K 1/2713; H02K 1/272; H02K 1/2726; H02K 1/2733; H02K 1/274; H02K 1/2746; H02K 1/2753; H02K 1/276; H02K 1/2766; H02K 1/2773; H02K 1/278; H02K 1/2786; H02K 1/2793; H02K 1/17
USPC ......... 310/156, 216.079, 263, 253, 214, 215
See application file for complete search history.

(56) References Cited

U.S. PATENT DOCUMENTS

| | | | | |
|---|---|---|---|---|
| 2,930,916 | A * | 3/1960 | Scanlon et al. ........... | 310/156.76 |
| 3,567,974 | A * | 3/1971 | Spingler ................... | H02K 1/17 310/154.18 |
| 3,891,881 | A * | 6/1975 | Harris et al. ........... | 310/216.062 |
| 4,464,596 | A * | 8/1984 | Miller ..................... | H02K 1/276 310/156.52 |
| 4,677,331 | A * | 6/1987 | Leitgeb .................... | 310/156.38 |
| 4,788,761 | A * | 12/1988 | Crawford ............... | H02K 3/345 29/596 |
| 5,128,575 | A * | 7/1992 | Heidelberg .......... | H02K 1/2786 310/156.41 |
| 5,894,182 | A * | 4/1999 | Saban ..................... | H02K 1/06 310/216.013 |
| 6,384,504 | B1 * | 5/2002 | Ehrhart ................. | H02K 1/2773 310/156.18 |
| 6,601,287 | B2 * | 8/2003 | Pop, Sr. .......................... | 29/596 |
| 6,603,232 | B2 | 8/2003 | Franco | |
| 6,800,977 | B1 * | 10/2004 | Ostovic ................ | H02K 1/2773 310/156.38 |
| 6,956,311 | B2 * | 10/2005 | Hosaka ................ | H02K 1/2753 310/156.38 |
| 6,995,489 | B2 * | 2/2006 | Ehrhart .................. | H02K 1/148 310/156.27 |

(Continued)

*Primary Examiner* — Dang Le

(57) ABSTRACT

A pole shoe element for an electrical machine is described. The electrical machine has a stator, a rotor and an air gap between the stator and the rotor. The pole shoe element contains a magnet receiving section which extends in a longitudinal direction of the pole shoe element, in which the pole shoe element in a peripheral direction of the rotor has a first width in a first radial inner position and in the peripheral direction has a second width in a second radial outer position. The second width is smaller than the first width.

14 Claims, 6 Drawing Sheets

(56) References Cited

U.S. PATENT DOCUMENTS

| | | | |
|---|---|---|---|
| 7,482,720 B2 * | 1/2009 | Gordon | H02K 1/185 290/44 |
| 2004/0108781 A1 * | 6/2004 | Razzell et al. | 310/112 |
| 2006/0145563 A1 * | 7/2006 | Hans | 310/218 |
| 2007/0145848 A1 * | 6/2007 | Nakahara et al. | 310/156.48 |
| 2008/0211326 A1 * | 9/2008 | Kang et al. | 310/44 |
| 2008/0278022 A1 * | 11/2008 | Burch et al. | 310/156.38 |
| 2009/0021105 A1 * | 1/2009 | Evans | 310/261 |

* cited by examiner

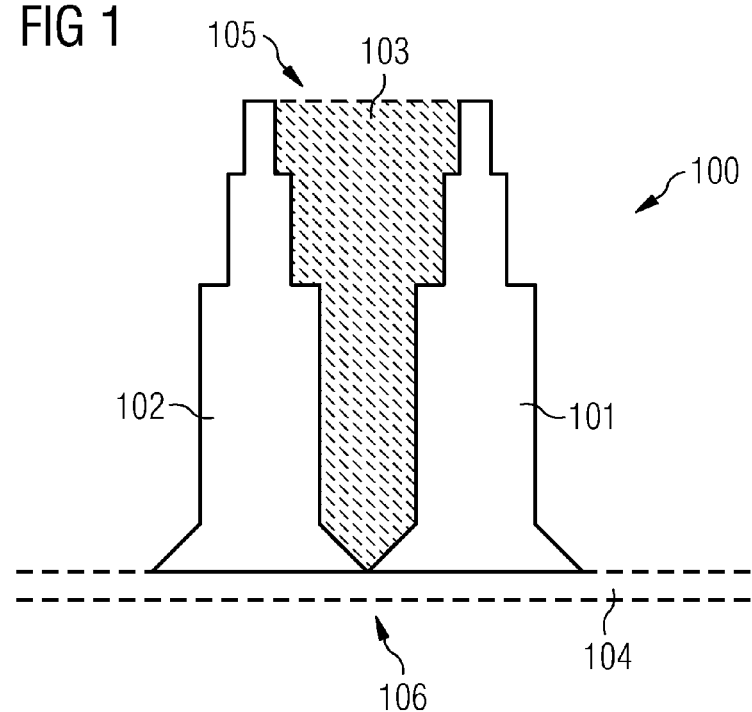
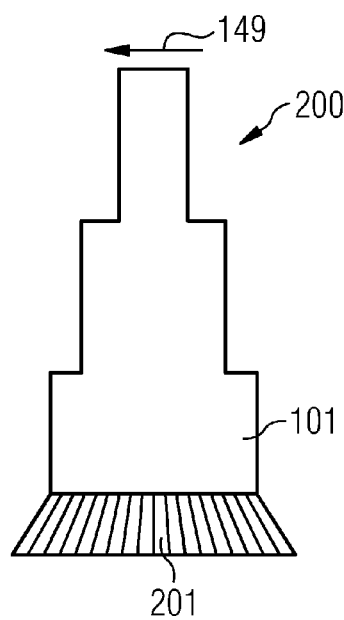
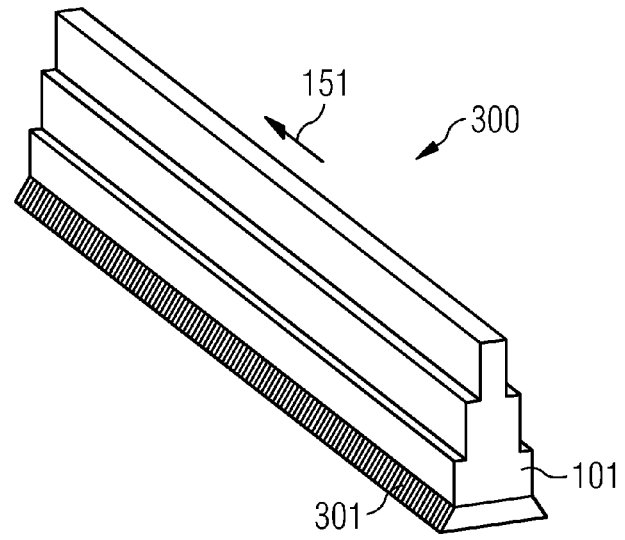

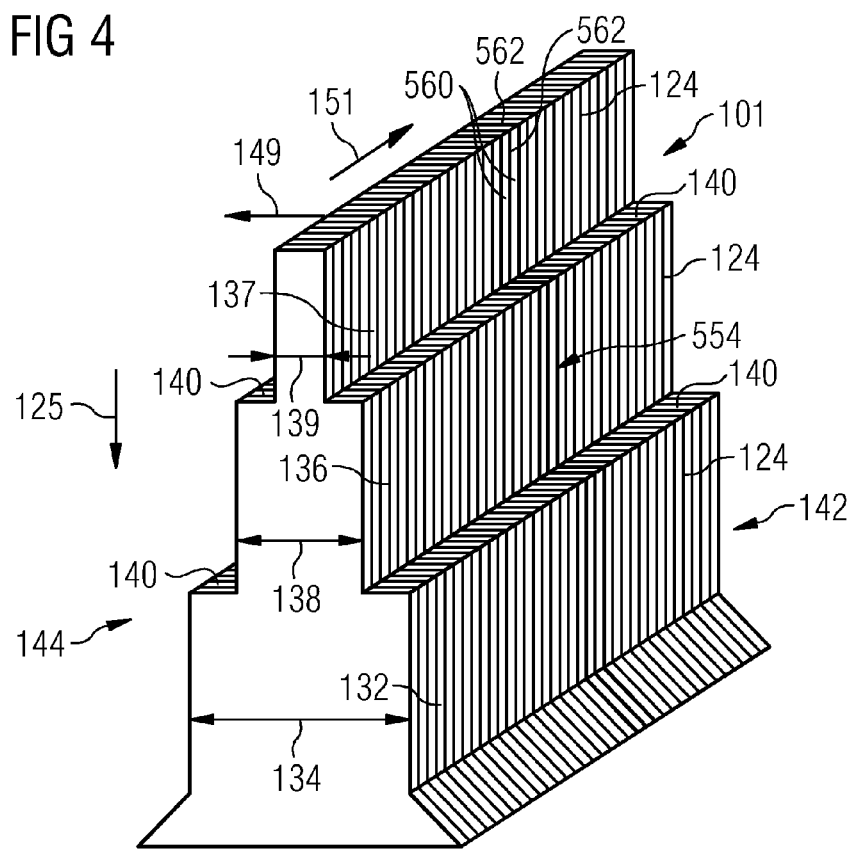
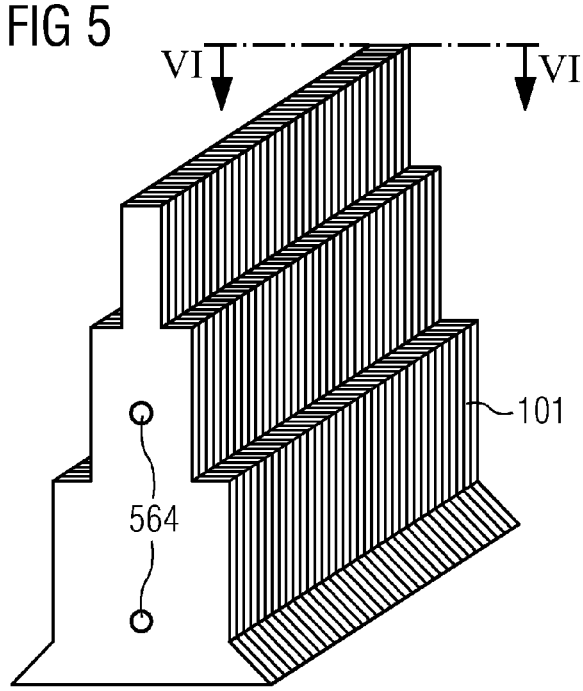

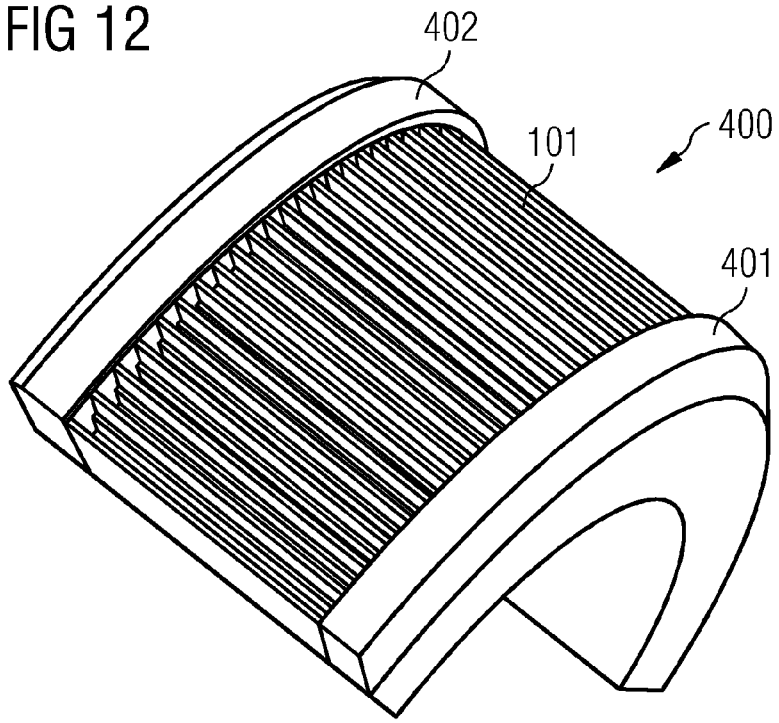
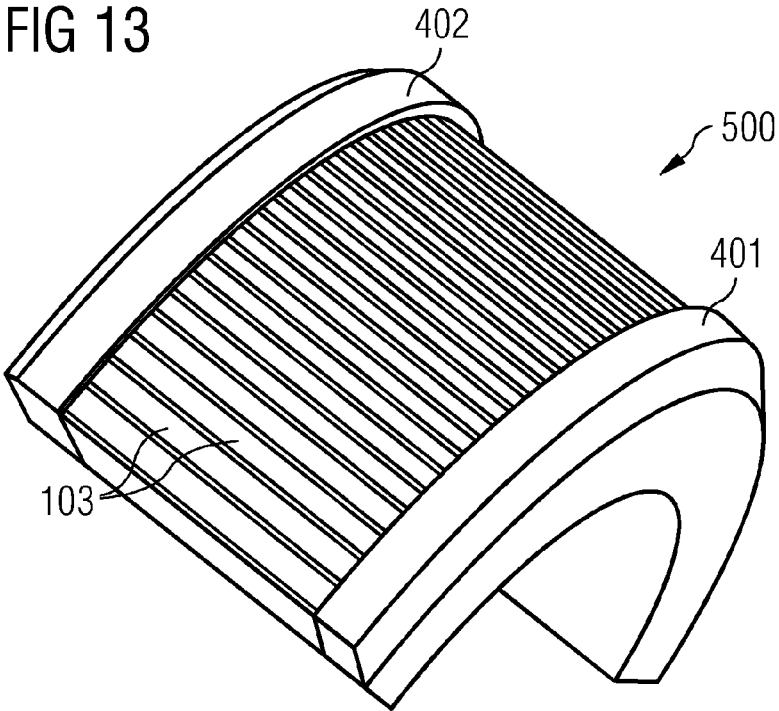

POLE SHOE ARRANGEMENT FOR A MACHINE ELEMENT OF AN ELECTRICAL MACHINE

CROSS REFERENCE TO RELATED APPLICATIONS

The present application claims priority to European Patent Office application No. 12164431.4 EP filed Apr. 17, 2012, and priority to European Patent Office application No. 12171279.8 EP filed Jun. 8, 2012, and priority to German application No. 10 2012 220 382.6 DE filed Nov. 8, 2012, the entire content of which is hereby incorporated herein by reference.

FIELD OF INVENTION

The present invention relates to the technical field of electrical machines which have a machine element having magnets, in particular permanent magnets, and which forms a stator and a rotor of the electrical machine, wherein the rotor can be rotated in respect of the stator. The invention relates in particular to a pole shoe arrangement for a rotor or a stator of an electrical machine. The invention further relates to a machine element in the form of a rotor or a stator and an electrical machine.

BACKGROUND OF INVENTION

An electrical machine is an electromechanical converter, which performs an energy conversion between mechanical energy and electrical energy by using a magnetic field link. The electrical machine may be for instance en electric motor (abbreviated to motor) or an electric generator (abbreviated to generator) or a motor/generator, which can be operated both as a motor and also as a generator. For instance, an electric generator is an electromechanical converter, which converts mechanical energy into electrical energy using a magnetic field link. An electric motor is an electromechanical converter, which converts electrical energy into mechanical energy using a magnetic field link. An electrical machine includes a stator and a rotor. The stator is an arrangement which represents the stationary part of an electrical machine. The rotor may represent a part or parts of the electrical machine which move relative to the stator arrangement, in particular relative to the stator arrangement. The rotor may therefore contain magnets, such as for instance permanent magnets, which rotate relative to one or a number of coils which are contained in the stator. In one form, the rotor rotates about the stator.

In conventional systems, the magnetized rotor and the wound stator are produced as independent components and are then combined. The magnets are embedded in a cylindrical steel rotor structure for instance by means of adhesion. Topologies of the rotor for flow concentration are usually used for electrical machines with a lower output. Nevertheless, in conventional arrangements magnets and iron parts are arranged close to one another in order to achieve a flow concentration.

SUMMARY OF INVENTION

There may therefore be a need for a pole shoe element of an electrical machine, with which high efficiency of the electrical machine is provided.

This need may be satisfied by the subject matter according to the independent claims. Advantageous embodiments of the present invention are described in the dependent claims.

According to one embodiment of a first aspect of the subject matters disclosed herein, a pole shoe element for an electrical machine is proposed, wherein the electrical machine has a stator, a rotor and an air gap between the stator and the rotor, the pole shoe element containing: a magnet receiving section extending in a longitudinal direction of the pole shoe element, in which the pole shoe element in a peripheral direction of the rotor has a first width in a first radial inner position and in the peripheral direction has a second width in a second radial outer position, wherein in a radial direction of the rotor, the first width passes into the second width in stages, and the second width is less than the first width.

The idea underlying this aspect of the subject matters disclosed herein is that on account of essentially wedge-shaped pole shoe elements, which in a peripheral direction of the rotor have a first, larger width in a first radial inner position and in the peripheral direction have a second, smaller width in a second radial outer position, the concentration of magnetic flow in the area between the rotor and the stator can be increased.

Unless specified otherwise, the term "air gap" herein refers to the air gap between the stator and the rotor of the electrical machine. The term "electrical machine" herein refers to an electromechanical converter, which is embodied to convert mechanical energy into electrical energy and/or electrical energy into mechanical energy by using a magnetic field link.

According to one embodiment, the rotor defines an axial direction which runs in parallel to an axis of rotation of the rotor and a peripheral direction, which is parallel to a direction of movement and/or a movement of a point on the rotor when rotating the rotor about its axis of rotation.

According to an embodiment, the pole shoe elements are produced from a ferromagnetic material, for instance ferromagnetic steel.

According to an embodiment, in a radial direction of the rotor the first width passes into the second width in stages. This allows for the use of magnet assemblies, which have square-shaped magnet modules in sections in the radial direction.

According to an embodiment, the magnet assembly has two or more separate permanent magnets. The permanent magnets of a magnet assembly can be fastened to one another by means of suitable fastening means, thereby facilitating the arrangement of the permanent magnets in the depression. According to an embodiment, the magnet assembly is inserted into a depression between two pole shoe elements. According to a further embodiment, the magnet assembly has a shape which corresponds to the shape of the depression. For instance, the shape of the magnet assembly may be complimentary to the shape of the depression. According to an embodiment, the at least two permanent magnets of a magnet assembly, which are fastened to one another, allow the at least two permanent magnets to be handled as one single piece. According to an embodiment, it is not individual magnets but instead magnet assemblies containing two or more individual magnets which are introduced into the depression. According to an embodiment, not all permanent magnets of a magnet assembly are fastened to one another, but instead just one part of the permanent magnets of a magnet assembly is fastened to one another and forms a magnet module. For instance, in accordance with one embodiment the magnet modules may be square-shaped.

According to an embodiment, the first width and the second width and the dimension of the permanent magnets are matched to one another so that the difference between the first width and the second width is a whole number multiple of the width of a permanent magnet. In this way, 1 more permanent magnet can be arranged for instance between two pole shoes in the radial outer position than in the radial inner position. This allows for the use of just one size of permanent magnets when assembling the magnet assembly. This can facilitate production, storage and transportation of the permanent magnets and assembly.

According to an embodiment, the pole shoe element has a plurality of ferromagnetic layers and a plurality of electrically insulating layers, wherein an electrically insulating layer is arranged between two ferromagnetic layers in each instance, which electrically insulate the two ferromagnetic layers from one another. Eddy currents can in this way be reduced in the pole shoe element.

According to an embodiment, the plurality of ferromagnetic layers and a plurality of electrically insulating layers form a layered part of the pole shoe element and the pole shoe element also has a solid part made of ferromagnetic material which is fastened to the layered part. Eddy currents can in this way be reduced for instance in the layered part, while the solid part ensures high mechanical stability of the pole shoe element.

According to an embodiment, one of the layered parts and the solid part has a groove, and the other of the layered parts and the solid part has a projection. For instance, the layered part can have a groove and the solid part has a projection. According to another embodiment, the layered part has a projection and the solid part has a groove. The projection-groove connection of the layered part and the solid part allows for a simple fastening of the two parts to one another, wherein the layered part can for instance also be exchangeable on the solid part.

According to an embodiment, the projection can be inserted in a longitudinal direction of the groove into the groove in an inserted position. The longitudinal direction of the groove can be parallel to the axial direction for instance. According to another embodiment, the longitudinal direction of the groove can be parallel to a longitudinal direction of the pole shoe element.

According to an embodiment, the groove and the projection have contact surfaces, which lie opposite one another in the inserted state and fix the projection in a direction at right angles to the longitudinal direction in the groove. In the inserted state, this prevents a movement of the solid part and the layered part relative to one another.

According to an embodiment, the pole shoe element is embodied such that in an assembled state, the layered part is opposite the air gap and the solid part is arranged on a side of the layered part facing away from the air gap. Eddy currents can in this way be reduced in an area of the pole shoe element which is adjacent to the air gap.

According to a further embodiment, the pole shoe element is completely formed from a plurality of ferromagnetic layers and the plurality of electrically insulating layers.

The ferromagnetic layers and the electrically insulating layers can be fastened to one another in any suitable manner. According to an embodiment, the ferromagnetic layers and the electrically insulating layers are adhered to one another. According to a further embodiment, the ferromagnetic layers and the electrically insulating layers are fastened to one another by a bolt, wherein the ferromagnetic layers and the electrically insulating layers each have a clearance, through which the bolt extends. It is apparent that two or more bolts can also be provided to fasten the layers to one another. According to an embodiment, the ferromagnetic layers have a first part of a locking structure and the electrically insulating layers have a second part of the locking structure, wherein the ferromagnetic layers and the electrically insulating layers can be mechanically fastened to one another by means of the first part of the locking structure and the second part of the locking structure. For instance, the ferromagnetic layers may have a projection, for instance a punching burr, which can be hooked with an adjacent electrically insulating layer and/or with an adjacent further ferromagnetic layer.

According to a further embodiment, the ferromagnetic layers and the insulating layers alternate in an axial direction of the rotor. According to a further embodiment, the ferromagnetic layers and the insulating layers alternate in a peripheral direction of the rotor. According to an embodiment, the direction of the layer sequence is oriented such that compared with another orientation a reduction in eddy currents is produced by the electrically insulating layers.

According to an embodiment, the pole shoe element extends in a longitudinal direction and the longitudinal direction of the pole shoe element mounted in the machine element is arranged oblique, for instance at a sharp angle, relative to an axis of rotation of the rotor (so-called skewing of the pole shoe element). According to another embodiment, the longitudinal direction of the pole shoe element mounted in the machine element proceeds in parallel to the axial direction.

According to an embodiment, the pole shoe element has an inner end, which is embodied so as to lie at least partially opposite the air gap of the electrical machine when the machine element is in an assembled state. Furthermore, according to an embodiment, the pole shoe element has an outer end which is opposite to the inner end. According to an embodiment, the inner end is formed by the layered part.

According to the embodiments of the first aspect of the subject matters disclosed herein, the pole shoe element is adjusted to deliver the functionality of one or more of the embodiments cited herein and/or to provide the functionality as is required by one or more of the embodiments disclosed herein, in particular also the embodiments of the other aspects of the subject matters disclosed herein.

According to an embodiment of a second aspect of the subject matters disclosed herein, a machine element for an electrical machine is provided, wherein the electrical machine has a stator, a rotor and an air gap between the stator and the rotor and the machine element either forms the rotor or the stator. According to an embodiment, the machine element contains a plurality of pole shoe elements according to one or several of the embodiments disclosed herein.

According to a further embodiment, the pole shoe elements are arranged in a pole shoe arrangement, in which two pole shoe elements lie opposite one another in each instance and are arranged at a distance from one another in a peripheral direction of the rotor, in such a manner that a depression for receiving a magnet assembly is formed between two opposing pole shoes in each instance.

According to an embodiment, the pole shoe element has a receiving surface for receiving a permanent magnet. According to an embodiment, a magnet assembly extends in the longitudinal direction only across a fraction of the length of the depression in the longitudinal direction. In other words, two or more magnet assemblies are arranged one behind the other in the depression in the longitudinal direction. For instance, between 5 and 20 magnet assemblies are arranged for instance in the longitudinal direction of the pole shoe elements (e.g. in the axial direction), irrespective of the length of the electrical machine. According to an embodiment, each pole shoe element has the receiving surface for receiving the permanent magnets. According to an embodiment, provision is made for the receiving surface to receive at least one permanent magnet, for instance two or more permanent magnets. According to an embodiment, the receiving surface is a planar surface. A planar surface may allow for a gap-free positioning of a square-shaped permanent magnet. According to an embodiment, the pole shoe elements are embodied so as to form a square-shaped or sectionally square-shaped depression, wherein the square shape is a right-angled square shape. This embodiment of the pole shoe elements can be realized for instance by correspondingly inclined receiving surfaces. A number of permanent magnets can be arranged for instance within a square-shaped section of the depression. The square-shaped and/or sectionally square-shaped depression allows for the use of square-shaped permanent magnets, which facilitates production and assembly of permanent magnets. The square-shaped permanent magnets may have a unit size, wherein the square-shaped permanent magnets are preferably combined to form a magnet assembly and fastened to one another. In conjunction with the staged pole shoe elements, the width of which is reduced in stages in respect of its radial outer end, advantageous forms of magnet assemblies and associated pole shoe elements can thus be realized with permanent magnets of a uniform size.

According to an embodiment, the pole shoe arrangement and in particular the pole shoe extends along a longitudinal direction, which proceeds at right angles to a rotational plane of the rotor. For instance, the pole shoe extends in one embodiment in parallel to the axis of rotation of the rotor. According to another embodiment, the pole shoe element extends obliquely to the axial direction, wherein the inner end of the pole shoe element rests on a cylindrical surface in order to define a cylindrical inner surface of the machine element and thus a cylindrical air gap.

According to embodiments of the second aspect of the subject matters disclosed herein, the machine element is adjusted so as to deliver the functionality of one or a number of embodiments cited herein and/or to provide the functionality such as is required by one or a number of embodiments cited herein, in particular also the embodiments of the other aspects of the subject matters disclosed herein.

According to an embodiment of a third aspect of the subject matters disclosed herein, an electrical machine is provided, which contains: a rotor; and a stator, wherein either the rotor or the stator is formed by a machine element according to one or a number of embodiments of the subject matters disclosed herein. The rotor can be rotated in respect of the stator. According to an embodiment, the rotor is formed by the machine element and the rotor can be rotated about the stator. In other words, the machine element according to an embodiment forms an outer rotor of an electrical machine, for instance a generator. According to a further embodiment, the rotor can be rotated radially inside the stator.

According to an embodiment, the electrical machine has at least one permanent magnet. For instance, the electrical machine may have one or a number of magnet assemblies according to embodiments of the subject matters disclosed herein. According to an embodiment, the permanent magnet is a ferrite magnet. Embodiments of the subject matters disclosed herein allow for an efficient use of ferrite magnets. This can allow for the use of the electrical machine in a wind turbine.

According to an embodiment, the electrical machine is a generator of a wind turbine.

According to embodiments of the third aspect of the subject matters disclosed here, the electrical machine is adjusted so as to deliver the functionality of one or a number of the embodiments cited herein and/or to provide the functionality, such as is required by one or a number of the embodiments cited herein, in particular also the embodiments of other aspects of the subject matters disclosed herein.

According to an embodiment of a fourth aspect of the subject matters disclosed herein, a wind turbine is provided, said wind turbine containing an electrical machine according to one or a number of the subject matters disclosed herein.

According to embodiments of the fourth aspect of the subject matters disclosed herein, the wind turbine is adjusted so as to deliver the functionality of one or a number of embodiments cited herein and/or to provide the functionality, such as is required by one or a number of the embodiments cited herein, in particular also the embodiments of the other aspects of the subject matters disclosed herein.

Further embodiments of the subject matters disclosed herein are described below, wherein the embodiments below can be combined arbitrarily with the preceding embodiments or can be applied to the preceding embodiments.

According to a further aspect of the subject matters disclosed herein, a pole shoe arrangement for the machine element (e.g. the rotor) of an electrical machine is provided, in particular for a direct drive external rotor generator concept, in which the electrical machine is a generator and includes the stator and the rotor, which can be rotated about the stator.

According to an embodiment, the pole shoe arrangement includes a first pole shoe element, which is formed from ferromagnetic material, and a second pole shoe element, which is formed from ferromagnetic material, wherein the first pole shoe element and the second pole shoe element are fastened on a support structure, for instance on a rotor support structure. It is apparent that the terms "first pole shoe element" and "second pole shoe element" can relate to any pole shoe elements of the electrical machine which lie opposite one another in the peripheral direction. The first pole shoe element and the second pole shoe element extend in an axial direction of the rotor and are at a distance from one another in a peripheral direction of the rotor such that the depression is formed in order to receive the magnet assembly. Each pole shoe element has a first width in the peripheral direction, in a first radial inner position, and a second width in the peripheral direction, in a second radial outer position, wherein the first width passes into the second width in stages in the radial direction, and wherein the second width is smaller than the first width.

The term "support structure" can in this context relate to a structure of a machine element, for instance a rotor, to which all necessary elements are fastened.

The term "pole shoe element" relates generally to magnetic elements, which deliver a flow distribution of the flow provided by the magnets. The pole shoe elements may be steel rods, for instance steel rotor rods, which can receive the magnets and the magnetic flow. The use of the pole shoe arrangement described herein achieves an improved distribution of the magnetic field, which flows through the rotor, while an electrical insulation is likewise delivered between adjacent magnets. Poles between the pole shoe elements can be provided by the magnets.

Embodiments of the pole shoe arrangement described herein, which form a radial outer machine element of the electrical machine, are based on the idea that an improved assembly of the outer-lying machine element can be achieved by using embodiments of the described pole shoe arrangement, since the permanent magnets can be inserted into the machine element, after the rotor and stator have been combined. Embodiments of the described arrangement allow the construction of surfaces to modularize assembled permanent magnet topology machine elements, while also improving the flow concentration or distribution. Even if the machine element forms an inner-lying machine element, the assembly of the permanent magnet(s) is in any case facilitated by embodiments of the subject matters disclosed herein, which enable an insertion of the permanent magnet into the machine element in the radial direction.

By using the described arrangement, an entirely modular machine element surface can be provided, wherein the entire surface of the machine element is produced from separate components. Since, according to an embodiment, all components, e.g. pole shoe elements and magnets are accessible from the outside, maintenance and repair of the machine element in particular of magnets which have failed, may be easier.

According to an embodiment of the subject matters disclosed herein, the first pole shoe element and the second pole shoe element are fixed on the support structure by bolts. The support structure may have various parts, to which the pole shoe elements can be fixed. In another embodiment, the first pole shoe element and the second pole shoe element are fastened on the support structure by means of adhesive or bolts or another fastening measure.

According to a further embodiment, the ferromagnetic material is magnetic steel. The composition of the magnetic steel may vary provided the magnetic steel delivers a ferromagnetic characteristic for receiving the flow of the magnets.

According to a further embodiment, a part of each pole shoe element, which is arranged on a radially inwardly-directed end of the machine element, is embodied as a lamination structure part.

The layered part of the pole shoe element may also be referred to as a lamination structure. As explained above, such a lamination structure can be used to reduce eddy current losses, which may appear in such a machine element. In particular, this part of the pole shoe element can be produced from laminated steel sheets. The rest of the pole shoe element may be in the form of a solid structure. This can deliver good stability of the pole shoe elements and good distribution of the flow. The lamination may exist in the axial or peripheral direction, according to the further machine element opposite the machine element, which may be a stator, if the machine element forms a rotor of the electrical machine.

According to a further embodiment, the lamination structure part, viewed cross-sectionally with a sectional plane, has a trapezoidal shape at right angles to the axial direction of the rotor.

In general, the pole shoe element according to an embodiment may have a radially inner part, which includes the inner end of the pole shoe element, and wherein the radially inner part is trapezoidal in its cross-section, in such a manner that the width of the radially inner part decreases radially outwards in one direction. The term "width of the pole shoe element" relates here and in general to the dimension of the pole shoe element in the peripheral direction.

To ensure that they have the trapezoidal cross-section in their radial inner part in a plane at right angles to the axial direction of the rotor, the pole shoe elements can be arranged close to one another, wherein the peaks of the trapezoid can abut one another. According to another embodiment, the peaks of the trapezoid of adjacent pole shoe elements can be arranged at distance from one another. Adjacent pole shoe elements have in this instance no contact points. If the magnet assembly has a square-shaped form, an air gap can be achieved between the air gap between the rotor and the stator, the magnet and the pole shoe elements. In other words, the magnet assembly is in this instance arranged at a distance from the air bap between the rotor and stator. This may improve the flow distribution.

According to an embodiment, the pole shoe elements are thus arranged at a distance from one another in the peripheral direction in order to define gaps between adjacent pole shoes, so as to avoid or at least reduce leakage paths for the magnetic flow.

It is generally proposed in accordance with an embodiment to minimize the magnetic flow between components conducting magnetic flow, such as for instance the pole shoe elements, which lie opposite one another and concentrate the magnetic flow in the direction facing a stator. Magnetic flow, between pole shoe elements and not running through the stator, which is guided for instance in components conducting magnetic flow, is also referred to as flow leakage (leakage of magnetic flow). The flow leakage does not lead to a mechanical torque being generated in the instance in which the electrical machine is configured as a motor, or to an electric current being generated in the event in which the electrical machine is configured as a generator. According to embodiments of the subject matters disclosed herein, a leakage of magnetic flow is reduced by distancing the pole shoes from one another. This increases the efficiency of the electrical machine.

The inner end of the pole shoe element is preferably arranged in the radial direction at a distance from the adjacent permanent magnets. This can be achieved for instance by a corresponding configuration of the receiving surfaces. According to an embodiment, an air gap is formed in the radial direction between the pole shoe element and the radially innermost permanent magnet. A final magnetization of the permanent magnets can be reduced or prevented in this way, which can be caused by strong magnetic fields in the air gap between the rotor and the stator. Such strong magnetic fields may occur for instance in a short-circuit. According to an embodiment, the air gap extending in the radial direction, which is formed between the radially innermost permanent magnets and the adjacent pole shoes, is arranged in a field which is usually demagnetized at most in the event of a short circuit.

In an alternative embodiment of the invention, it is proposed to provide the permanent magnets with sections which are arranged in areas adjacent to the pole shoes, so that each pole shoe is at a distance from the adjacent permanent magnets in the radial inward direction. Subsequently the area which is prone to demagnetization is remote. A reduction in the effects of the demagnetization can increase the service life of the machine part, which contains permanent magnets. Subsequently a correspondingly embodied electrical machine can operate reliably for extended periods of time.

In a preferred embodiment of the invention, each pole shoe element (e.g. of a rotor) has an arched section, which is adjusted so as to lie opposite the radially opposing machine part (e.g. a stator) of the electrical machine. The arched section is configured such that the magnetic field, which is structured toward the radially opposing machine part, has an adequate geometry for the efficient generation of mechanical torque or for the efficient generation of electrical currents by means of electromagnetic induction.

In order to eliminate leakage paths of the magnetic flow, according to an embodiment the pole shoe elements are preferably arranged at a distance from one another in the peripheral direction of the machine element without being connected by components conducting magnetic flow. In particular, the pole shoe elements according to an embodiment are not connected by components which are produced from a ferromagnetic metal, such as for instance, inter alia, iron. In other words, a connector, which mechanically connects at least two pole shoe elements to one another, and fixes the relative position of the pole shoe elements in respect of one another, has no continuous path made of ferromagnetic material, but instead contains at least one distance element, which holds the ferromagnetic parts at a distance, wherein the distance element is formed from a non-ferromagnetic material. An elimination of rear-sided, radially outer-lying leakage parts further improves the efficiency of the electrical machine, since unnecessary flow leakage is omitted. According to an embodiment, the permanent magnets of the rotor are provided with adequate thickness so as to contribute to the mechanical stability of the machine element and if necessary ensure the stability. According to an embodiment, the pole shoe element is formed as a part with a triangular cross-section. According to a further embodiment, the pole shoe element in a sectional plane at right angles to the axial direction has a triangular or essentially triangular section.

According to a further embodiment, a non-ferromagnetic cover is fastened to the magnetic assembly.

The cover may provide protection for the permanent magnets and may also provide a fastening of the permanent magnets. Furthermore, the cover may provide a fastening so as to eliminate the vibration in the radial direction on account of magnetic part tolerances. The cover may be non-magnetic steel or aluminum, positioned on the outer periphery of the magnet assembly. The cover may have a layer of soft or dampening material (such as foam or rubber), which is positioned between the cover and the magnet assembly. Shifting the cover from the outer periphery into the radial direction allows the flexible or soft material to provide the cover, provided it is moved downwards, as required, on account of the tolerances of the permanent magnets or magnet assemblies.

The terms "non-magnetic" and "non ferromagnetic" are generally used synonymously herein, i.e. the term "non-magnetic" is always to be read as "non-ferromagnetic".

The cover may be screwed to the pole shoe element. This may likewise aid the magnet assemblies to be held at the location and position.

Furthermore, the dampening material can also serve to mechanically dampen as a seal, in order to rule out particles, humidity or salty air, water or each other type of liquids or dirt penetrating the electrical machine.

According to a further embodiment, end plates are arranged on the axial ends of the machine element (e.g. the rotor).

The pole shoe elements may be arranged inter alia at an angle between the end plates, in order to allow for an offset (skewing, incline). The end plates can be manufactured from non-magnetic material in order to prevent a short-circuiting of the magnet. The end plates can be used to fasten the pole shoe elements on the machine element (e.g. on the rotor).

According to a further aspect of the subject matters disclosed herein, an electrical machine is provided, including a stator and a rotor as described above, wherein the rotor can be rotated in respect of the stator and one of the rotor and the stator is formed by a machine element according to one or several of the embodiments disclosed herein. According to an embodiment, the machine element is arranged outer-lying, i.e. the machine element forms an outer-lying rotor or an outer-lying stator. As generally usually indicated "outer-lying" in this context means that the machine element is arranged radially outside the further machine element.

An embodiment of the provided electrical machine is based on the idea of magnets being able to be provided in the machine element, since the rotor and the stator have been merged together. This can be achieved by the outer-lying arrangement of the pole shoe elements, which provides an opening in the depression on the outer side of the machine element for insertion of the magnet assembly.

According to a further aspect of the subject matters disclosed here, provision is made for a wind turbine for the generation of electrical power. The provided wind turbine includes a tower, a wind turbine rotor, which is arranged on the upper part of the tower, and which has at least one blade, and an electrical machine in the form of a generator, as described herein, wherein the generator is mechanically coupled to the wind turbine rotor, for instance without interconnecting a drive (direct drive generator).

It is advantageous with the design of a wind turbine to keep the mass in an upper region of the tower, i.e. in particular the mass of the gondola and of the generator, to a minimum. In this way the costs for the transportation and for fundaments and the tower may be relatively low. A low weight of the generator may be achieved by permanent magnets with a provided nominal output of the generator for instance, which contain rare earths (rare earth magnets). Rare earth magnets are nevertheless expensive and exert very high magnetic forces. An exchange of rare earth magnets is barely possible in a conventional generator following installation of the generator in a wind turbine.

A generator according to embodiments of the subject matters disclosed herein solves or reduces some of the problems of conventional generators for wind turbines. According to an embodiment of the subject matters disclosed herein, the at least one permanent magnet is a ferrite magnet. Although with the same nominal power the mass of the generator may be higher than with conventional generators with rare earth magnets, the generator is more cost-effective in terms of production and the price level of the ferrite magnets is more constant than that of the rare earth magnets. Furthermore, the magnets can be exchanged easily, even if the generator is already installed in the wind turbine. In particular for the outer rotor (i.e. a generator with the outer-lying rotor), an exchange can take place easily, for instance with a small crane in the gondola. Assembly or exchange of faulty magnets can thus then take place even if the generator is already installed in the wind turbine. A further advantage of the ferrite magnets is that the magnet temperature is less problematic than with rare earth magnets and thus the cooling of the generator is facilitated.

According to an embodiment, the ferrite magnets are assembled in the generator in the form of a magnet assembly. It is generally cost-effective and efficient to produce the permanent magnets in a standard size and to arrange the same in an assembly.

According to an embodiment, the electrical machine is a directly driven generator of a wind turbine with an outer-lying rotor.

It must be noted that embodiments were described with respect to different subject matters. In particular, some embodiments were described with reference to claims of the apparatus type, while other embodiments were described with reference to claims of the method type. A person skilled in the art will however gather from the preceding and subsequent description, that unless otherwise specified in addition to each combination of features which belong to a type of subject matters, each combination between features, which relate to different subject matters, in particular between features of claims of the apparatus type and features of claims of the method type, are also regarded as disclosed with this document.

BRIEF DESCRIPTION OF THE DRAWINGS

The afore-defined aspects and further aspects of the present invention are evident from the examples of the embodiments, which are to be described here below and which are explained with reference to the exemplary embodiments. The invention will be described herein in more detail below with reference to exemplary embodiments to which the invention is however not restricted.

FIG. 1 shows a pole shoe arrangement according to embodiments of the subject matters disclosed herein.

FIG. 2 shows a pole shoe arrangement according to embodiments of the subject matters disclosed herein.

FIG. 3 shows a pole shoe arrangement according to embodiments of the subject matters disclosed herein.

FIG. 4 shows a pole shoe element according to embodiments of the subject matters disclosed herein.

FIG. 5 shows a pole shoe element according to embodiments of the subject matters disclosed herein.

FIG. 12 shows a machine element according to embodiments of the subject matters disclosed herein.

FIG. 13 shows a machine element according to embodiments of the subject matters disclosed herein.

DETAILED DESCRIPTION OF INVENTION

Figure 6:
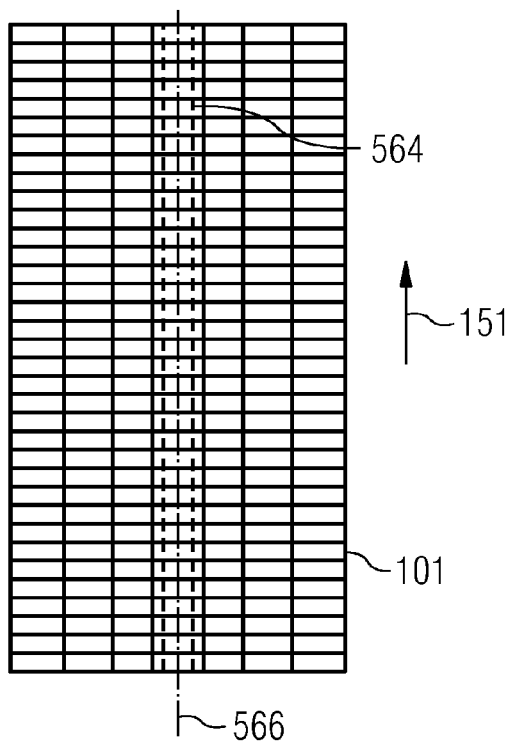
FIG. 6 shows the pole shoe element from FIG. 5, in a top view along the line VI-VI.

The representation in the drawings is schematic. It is noted that similar or identical elements in various figures are provided with the same reference characters.

FIG. 1 shows a pole shoe arrangement 100 according to embodiments of the subject matters disclosed herein.

The pole shoe arrangement can be used for instance for a rotor of an electrical machine, wherein the electrical machine has a stator and the rotor which can be rotated about the stator. According to another embodiment (not shown), the rotor can be arranged so as to be rotatable within the stator, wherein in this instance according to an embodiment, the outer-lying stator has the pole shoe arrangement 100.

Alternatively, the inner-lying rotor or an inner-lying stator can also have the pole shoe arrangement 100. The pole shoe arrangement includes a first pole shoe element 101 and a second pole shoe element 102. Both pole shoe elements can be produced from ferromagnetic material, such as ferromagnetic steel. The pole shoe elements can receive the flow of a magnet assembly 103. According to an embodiment, the electrical machine, as is descried in respect of the drawings, is a generator. According to a further embodiment, the machine element, as is described in respect of the drawings, is a rotor. It goes without saying that this is only exemplary and that according to other embodiments, the electrical machine can be a motor, and/or the machine element a stator.

The pole shoe elements 101, 102 are fastened to the rotor for instance to a rotor support structure (not shown). The pole shoe elements extend in a longitudinal direction 151, for instance in an axial direction, as can be seen in FIG. 3, where the pole shoe element 101 of a pole shoe arrangement 300 is shown in an axial view. The pole shoe elements 101, 102 are arranged at a distance in respect of one another in a peripheral direction of the rotor so that a depression is formed in order to receive the magnet assembly 103. The shape of the depression may correspond to the shape of the magnet assembly 103. For instance, the contour of the magnet assembly 103 may be complementary to the contour of the depression. Each pole shoe element has a first width in the peripheral direction in a first radial inner position and has a second width in the peripheral direction in a second radial outer position. In other words, the pole shoe elements become thinner toward the radial outer end of the rotor. Nevertheless, in each instance the inner widths are larger than the outer widths. The transitions between the widths are formed in stages in accordance with one embodiment. According to another embodiment, the transition between the first width and second width can occur continuously. For instance the pole shoe element according to an embodiment may have a conical cross-section.

The largest width of the pole shoe element is in a position close to the air gap 104 between the rotor and the stator 106 (or the magnetic air gap of the electrical machine). The smallest width of the pole shoe element is in a position close to the exterior 105 (air) of the rotor. For instance, the pole shoe element 101, 102 may have the largest width at its inner end facing the air gap 104 and the smallest width at its outer end opposing the inner end.

FIG. 2 shows a pole shoe arrangement 200 according to embodiments of the subject matters disclosed herein.

According to an embodiment, the widest part of the pole shoe element 101, i.e. the part 201 which is also adjacent to the magnetic air gap of the electrical machine, can, in the peripheral direction, have a cross-section in the form of a trapezoid at right angles to the longitudinal direction (for instance at right angles to the longitudinal direction), which tapers away from the air gap in terms of its width, as shown in FIG. 2. This part 201 of the pole shoe element 101 may be produced from a lamination structure. This may be advantageous in reducing eddy current losses. As show in FIG. 2, the laminations may be arranged peripherally, i.e. the sequence of different layers of the lamination takes place in a peripheral direction 149.

FIG. 3 shows a pole shoe arrangement 300 according to embodiments of the subject matters disclosed herein.

According to an embodiment, an axial arrangement of the laminations is shown in FIG. 3, i.e. the sequence of layers in the part 301 of the pole shoe element 101, which opposes the air gap, takes place in the longitudinal direction 151.

According to an embodiment, the arrangement of laminations is to correspond to the arrangement of the stator.

FIG. 4 shows a pole shoe element 101 according to embodiments of the subject matters disclosed herein. According to an embodiment, the pole shoe element 101 has a magnet receiving section 554 extending in a longitudinal direction 151, in which the pole shoe element 101 in a peripheral direction 149 of the rotor of the electrical machine, which is assigned the pole shoe element, has a first width 134 in a first radial inner position 132 and in the peripheral direction has a second width 138 in a second radial outer direction, as a result of which a stage 140 is formed in the magnet receiving section 554. According to a further embodiment, the pole shoe element 101 in a third radial outer position 137 in the peripheral direction has a third width 139, wherein in the radial direction 125, the width of the pole shoe element in the peripheral direction passes from the second radial outer width 138 to the third radial outer width 138 in stages, in order to form a further stage 140 in the magnet receiving section 554. According to an embodiment, the second width 138 is smaller than the first width 134 and the third width 139 is smaller than the second width 138.

According to embodiments, the pole shoe element 101 has at least one stage 140 in the magnet receiving section 554, for instance two stages 140, such as is shown in FIG. 4. According to an embodiment, the pole shoe element is embodied symmetrically, i.e. two sides 142 and 144 of the pole shoe element 101 facing away from one another are embodied in a manner such that both sides 142, 144 have receiving surfaces 124, to which permanent magnets of the electrical machine can be assigned. According to an embodiment, three receiving surfaces 124 are arranged in the radial direction 125, said receiving surfaces each being separated from one another by the stages 140. The symmetrical embodiment of the pole shoe element 101 allows both sides 142, 144 of the pole shoe element to be equipped with permanent magnets.

According to an embodiment, the pole shoe element 101 has a plurality of ferromagnetic layers 560 and a plurality of electrically insulting layers 562, wherein an electrically insulating layer 562 is arranged between two ferromagnetic layers 562 in each instance, which electrically insulates the two ferromagnetic layers 562 from one another. Some of the ferromagnetic layers are identified with 560 and some with 562. On account of the alternating ferromagnetic layers 560 and insulating layers 562, eddy currents in the pole shoe element 101 can be reduced. The ferromagnetic layers 560 and the insulating layers 562 can be connected to one another in any suitable manner, for instance by means of adhesive, as shown in FIG. 4, or according to other embodiments, by mechanical fixing elements.

FIG. 5 shows a pole shoe element 101 according to embodiments of the subject matters disclosed herein.

The pole shoe element 101 in FIG. 5 is embodied to fix the ferromagnetic layers 560 and the electrically insulating layers 562 are embodied identically to the pole shoe element 101 from FIG. 4. According to an embodiment, the pole shoe element 101 includes at least one clearance hole 564, through which a bolt can be arranged, by means of which the ferromagnetic layers 560 and the electrically insulating layers 562 are pressed onto one another and as a result fastened to one another.

According to an embodiment, locking structures are provided instead of the clearance hole 564 or in addition to the clearance holes 564, for instance punching burrs, wherein the ferromagnetic layers have a first part of the locking structure and the electrically insulating layers have a second part of the locking structure, wherein the ferromagnetic layers and the electrically insulating layers can be mechanically fastened to one another by means of the first part of the locking structure and the second part of the locking structure.

FIG. 6 shows the pole shoe element 101 from FIG. 5 in a top view along the line VI-VI. According to an embodiment, the clearance holes 564 extend in parallel to the longitudinal direction 151 of the pole shoe element 101. According to an embodiment, the clearance hole 564 extends in parallel to the axial direction 566 of the electrical machine, which is defined by the axis of rotation of the rotor of the electrical machine, as shown in FIG. 6.

Figure 7:
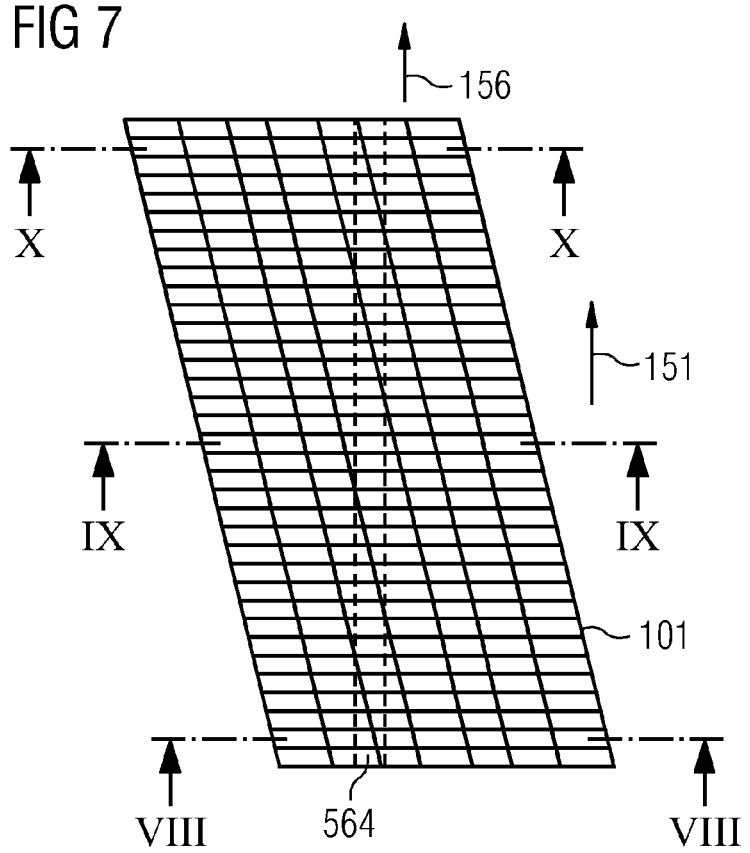
FIG. 7 shows a pole shoe element according to embodiments of the subject matters disclosed herein.

FIG. 7 shows a pole shoe element 101 according to embodiments of the subject matters disclosed herein. According to an embodiment, the pole shoe element 101 extends along its longitudinal direction 151, wherein the longitudinal direction is arranged obliquely with respect to an axial direction 566. In other words, the ferromagnetic layers 560 and the electrically insulating layers 562 are in each instance laterally displaced by a small amount from the axial direction 566. This deviation of the longitudinal direction 151 of the pole shoe element from the axial direction 566 is referred to as skewing and is advantageous in that a torque ripple of the electrical machine is reduced. Furthermore, the "skewing" reduces cogging torques, which allow the rotor of the electrical machine to engage at specific rotational positions. As a result, vibrations and noises of the electrical machine can thus be reduced.

Figure 8:
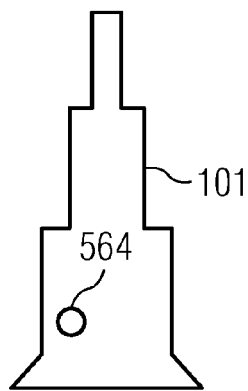
FIGS. 8, 9 and 10 show sectional representations of the pole shoe element from FIG. 7 at various axial positions.
Figure 9:
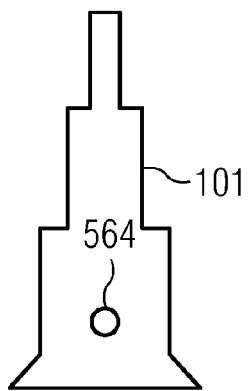
Figure 10:
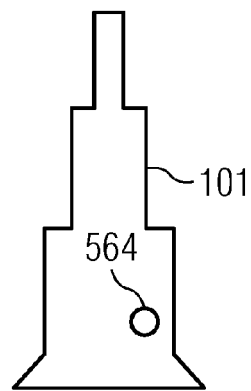

With a bolt connection of the ferromagnetic layers and the electrically insulating layers, according to an embodiment the clearance hole 564 passes obliquely through the pole shoe element 101. FIGS. 8, 9 and 10 show in a sectional representation the pole shoe element 101 from FIG. 7 at different axial positions, which are identified in FIG. 7 by VIII-VIII, IX-IX and X-X.

According to an embodiment, the pole shoe element is entirely formed from the plurality of ferromagnetic layers 560 and electrically insulating layers 562, such as pole shoe elements 101 in FIG. 4, the pole shoe element 101 in FIG. 5 and the pole shoe element 101 in FIG. 6 to FIG. 10.

Figure 11:
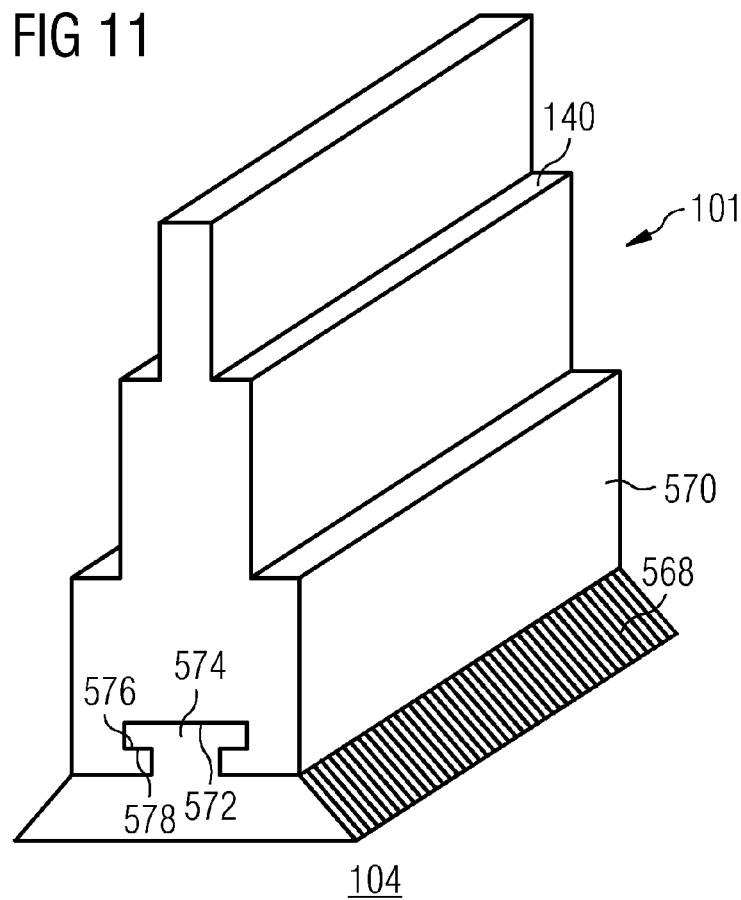
FIG. 11 shows a pole shoe element according to embodiments of the subject matters disclosed herein.

FIG. 11 shows a pole shoe element 101 according to embodiments of the subject matters disclosed herein. Features of the pole shoe element 101, which have already been discussed with respect to FIGS. 4 to 190, are omitted in the description of FIG. 11, wherein similar or identical elements are designated with the same reference characters.

According to an embodiment, the plurality of ferromagnetic layers 560 and the plurality of electrically insulating layers form a layered part 568 of the pole shoe element. Furthermore, according to an embodiment, the pole shoe element has a solid part 570 made of ferromagnetic material, which is fastened to the layered part 568. In this way the properties of the pole shoe element 101 can be varied, wherein for instance in the layered part 568, eddy currents are more effectively suppressed than in the solid part, whereas the solid part 570 can provide higher mechanical stability for instance. A skewing of the solid part 570 can ensue for instance by corresponding mechanical processing in the manufacture of the solid part.

According to an embodiment, one of the layered part 568 and the solid part 570 has a groove, for instance the solid part 570. The other of the layered part and the massive part, for instance the layered part 568, has a projection 574, which can be moved into the groove 572. According to an embodiment, the groove 572 and the projection 574 have contact surfaces 576, 578, which oppose one another in the inserted state and fix the projection in a direction at right angles to the longitudinal direction 151 in the groove 572. According to an embodiment, the pole shoe element is embodied such that in an assembled state, in which the projection 574 is moved into the groove 572, and the pole shoe element is at its provided position in the electrical machine, the layered part 568 opposes the air gap 104 and the solid part 570 is arranged on a side of the layered part which faces away from the air gap 104.

FIG. 12 shows a machine element 400 according to embodiments of the subject matters disclosed herein, which may exist in the form of a rotor for instance.

As shown in FIG. 12, end plates 401, 402 can be arranged at the axial ends of the rotor 400 (for instance at the end faces of the pole shoe element 101), e.g. in the form of a front plate and a rear plate. The pole shoe elements 101 can be fastened to the rotor by being welded or screwed on the end plates. A plurality of pole shoe elements 101 can be arranged on the rotor structure, wherein each extends between the end plates and is arranged at a distance from the next pole shoe element so as to form a depression for the magnet assembly.

FIG. 13 shows a machine element 500 according to embodiments of the subject matters disclosed herein, which may exist in the form of a rotor for instance.

As shown in FIG. 13, the magnet assemblies 103 can be inserted into the depressions, which are provided by the pole shoe elements 101. According to an embodiment, the radial outer surface of the rotor 500 is subsequently covered by magnet assemblies. The magnet assemblies can be covered with a non-magnetic material providing protection. The non-magnetic (non-ferromagnetic) material may for instance be a cover according to an embodiment of the subject matters disclosed herein.

Figure 14:
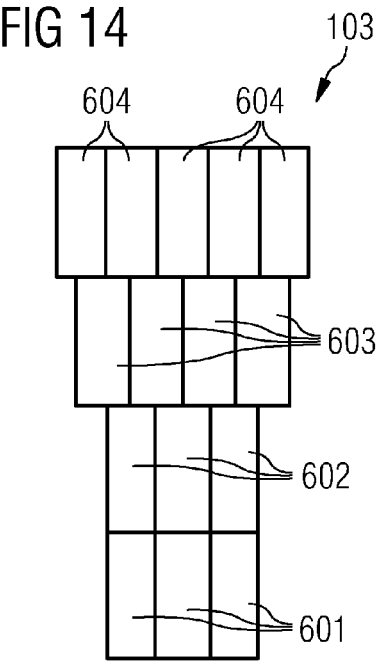
FIG. 14 shows a magnet assembly according to embodiments of the subject matters disclosed herein.

FIG. 14 shows a magnet assembly 103 according to embodiments of the subject matters disclosed herein.

The magnet assembly 103, as shown by way of example in FIG. 14, is made up of a plurality of individual permanent magnets 601 to 604, which form the contour of the depression 148. The individual magnet pieces (permanent magnets) are preferably no larger than 25 cm in edge length.

In the example shown in FIG. 14, the magnet assembly 103 consists of 15 parts. The magnet pieces (permanent magnets) have exactly the same dimensions. This may be advantageous in that the design is modular and the various magnet pieces can be easily handled. The magnet pieces may have different materials. For instance, the magnet pieces 601, which are closer to the air gap, have a higher coercive field strength in order to better resist a final magnetization field, which opposes the magnets in the event of a short circuit. The other magnet pieces 602, 603 and 604 may have a lower coercive field strength. As described herein, the magnet assemblies according to an embodiment may have a plurality of ferrite magnets fastened to one another.

According to an embodiment, not all permanent magnets of a magnet assembly are fastened to one another, instead only part of the permanent magnets of a magnet assembly is fastened to one another and forms a magnet module. By way of example, the magnets lying opposite one another in the peripheral direction, e.g. the magnets 601, can be fastened to one another in order to form a magnet module of the magnet assembly. The subdivision of a magnet assembly into magnet modules, in which the permanent magnets are connected to one another (fixed to one another), can take place depending on the size and weight of the magnet module. Naturally all permanent magnets of a magnet assembly can also be fixed to one another, e.g. fastened to one another.

Figure 15:
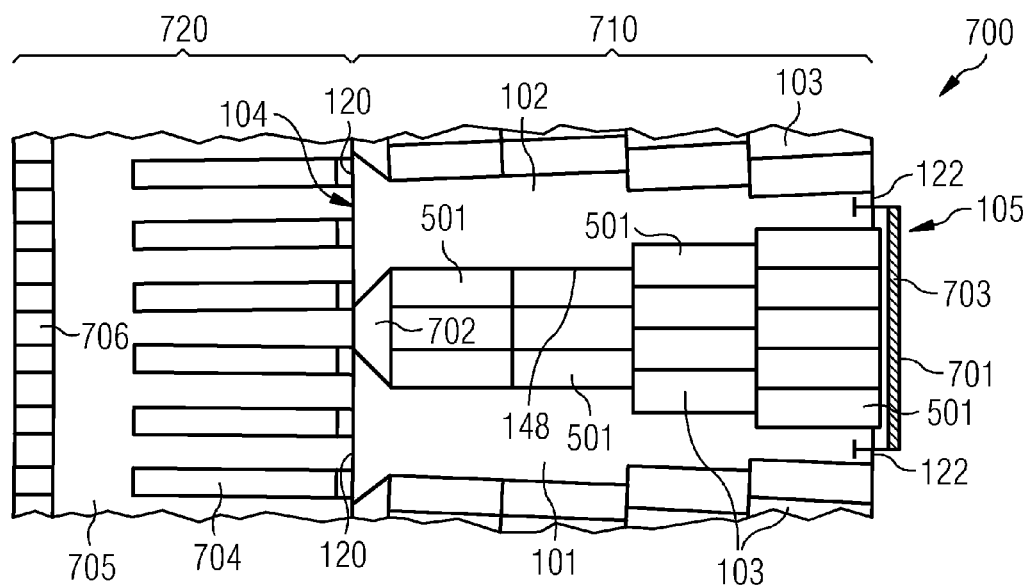
FIG. 15 shows a part of an electrical machine according to embodiments of the subject matters disclosed herein.

FIG. 15 shows a part of a complete electrical machine 700 according to embodiments of the subject matters disclosed herein in the form of a generator, in particular a wind turbine generator. The rotor 710 is arranged so as to be rotated about the stator 720. The stator is connected to a shaft 706 and has a coil arrangement 705, wherein air gaps 704 are formed between the coils. The rotor 710 forms a machine element according to embodiments of the subject matters disclosed herein.

An air gap 104 is formed between the rotor 710 and the stator 720. Furthermore, an air gap 702 is formed by the pole shoe elements 101, 102 and the magnet assembly 103. A further magnet assembly 103 can be arranged on the sides of the pole shoe elements, which lie opposite to the magnet assembly 103. Reference is expressly made to it not being permitted to exchange the air gaps 702 and 704 with the air gap 104 between the rotor 710 and the stator 720. Provided reference is made herein at another point to an "air gap", the air gap between the rotor and the stator is always meant, unless not otherwise specified in the case of the air gap 702 and 704.

A cover 701 can be arranged upwardly on the magnet assembly 103 toward the rotor exterior 105, which may be air. This may provide protection against contamination. To reduce vibrations, a dampening material 703 can be arranged between the cover 701 and the magnet assembly 103.

The machine element 710 has a first pole shoe element 101 and a second pole shoe element 102, which is arranged at a distance from the first pole shoe element 101 in such a manner that a depression 148 for receiving at least one permanent magnet 501 is formed between the first pole shoe element 101 and the second pole shoe element 102. Each pole shoe element has an inner end 120 and an outer end 122. The machine element further contains the at least one permanent magnet 501 in the depression 148. According to an embodiment, a plurality of permanent magnets is arranged in the depression, as shown in FIG. 15, in which a part of the permanent magnets is identified with 501. According to an embodiment, the permanent magnets 501 form the magnet assembly 103, which is arranged in the depression. According to an embodiment, the magnet assembly 103 has an outer shape which corresponds to the shape of the depression, so that the magnet assembly 103 can be inserted into the depression 148.

According to an embodiment and as shown in FIG. 15, the permanent magnet 501, to which reference is made in this description, can always be a permanent magnet of a magnet assembly 103.

The pole shoe arrangements described herein and magnet assemblies may provide the following advantages: no reverse iron path is required; instead, a non-magnetic cover may be used with a dampening effect. No front iron path is required, thereby resulting in an air gap between the pole shoes in a peripheral direction. A modular magnet module design can be achieved by using the same geometric dimensions of the magnet pieces. This can also result in a simple assembly on account of the puzzle-type design, where all magnet modules are inserted between two rotor pole shoe elements. The modularity of the design may also allow for assembly from the side (air), which can reduce the transport costs. Furthermore, the service and the maintenance of the rotor are easier on account of easier access to the magnet modules and the pole elements. The modular design also allows for exchangeability in the case of a faulty magnet modules or pole shoe element. Since mechanical and electromagnetic structure functionality are combined, an optimized use of material and a more compact electrical machine can be achieved.

The dimensions provided herein are solely to specify by way of example possible dimensions for the relevant elements. It goes without saying that these exemplary dimensions are always to be adjusted to the requirements and size of the electrical machine and thus may considerably exceed or not reach the exemplary dimensions.

It should also be noted that the terms "having" and "including" do not exclude other elements or steps and that "a" does not exclude a plurality. Elements which are described in conjunction with the various embodiments can also be combined. It should also be noted that reference characters in the claims are not to be configured as the scope of the claims to a limited extent.

To summarize, according to an embodiment, a pole shoe element 101 for an electrical machine 700 is described, wherein the electrical machine 700 has a stator 720, a rotor 710 and an air gap between the stator 720 and the rotor 710. The pole shoe element 101 contains according to an embodiment a magnet receiving section 554 extending in a longitudinal direction 151 of the pole shoe element 101, in which the pole shoe element 101 in a peripheral direction 149 of the rotor 710 has a first width 134 in a first radial inner position 132 and in the peripheral direction a second width 138 in a second radial outer position 136, wherein the second width 138 is smaller than the first width 134. The magnet receiving section 554 may be along an outer edge of the pole shoe element 101 extending away from the air gap 104.

The invention claimed is:

1. A pole shoe element for an electrical machine comprising a stator, a rotor and an air gap between the stator and the rotor, comprising:
   a magnet receiving section along an outer edge extending away from the air gap and extending in a longitudinal direction of the pole shoe element,
   wherein the pole shoe element, in a peripheral direction of the rotor, has a first width in a first radial inner position and has a second width in a second radial outer position,
   wherein the second width is smaller than the first width, and
   wherein the first width passes into the second width in continually smaller in width stages in a radial direction of the rotor.

2. The pole shoe element as claimed in claim 1, further comprising a plurality of ferromagnetic layers and a plurality of electrically insulating layers, wherein one of the electrically insulating layers is arranged between two of the ferromagnetic layers respectively that electrically insulate the two ferromagnetic layers from one another.

3. The pole shoe element as claimed in claim 2,
   wherein the plurality of ferromagnetic layers and the plurality of electrically insulating layers form layered parts of the pole shoe element; and
   wherein the pole shoe element comprises a solid part made of ferromagnetic material fastened to the layered parts.

4. The pole shoe element as claimed in claim 3,
   wherein one of the layered parts and the solid part comprises a groove and the other of the layered parts and the solid part comprises a projection,
   wherein the projection is operable to be inserted into an inserted position in the groove in a longitudinal direction of the groove, and
   wherein the groove and the projection comprise contact surfaces that lie opposite one another in an inserted state and fix the projection in the groove in a direction at right angles to the longitudinal direction of the groove.

5. The pole shoe element as claimed in claim 3, wherein when the pole shoe element is in an assembled state, one of the layered parts lies opposite an air gap and the solid part is arranged on a side of the one of the layered parts which faces away from the air gap.

6. The pole shoe element as claimed in claim 2, wherein the pole shoe element is formed from the plurality of ferromagnetic layers and the plurality of electrically insulating layers.

7. The pole shoe element as claimed in claim 2, further comprising at least one of the following features:
   the ferromagnetic layers and the electrically insulating layers are adhered to one another;
   the ferromagnetic layers and the electrically insulating layers are fastened to one another by bolts, wherein the ferromagnetic layers and the electrically insulating layers each comprises a clearance through which the bolts extend;
   the ferromagnetic layers comprise a first part of a locking structure and the electrically insulating layers comprise a second part of the locking structure, wherein the ferromagnetic layers and the electrically insulating layers are operable to be mechanically fastened to one another by the first part of the locking structure and the second part of the locking structure;
   the ferromagnetic layers and the insulating layers alternate in an axial direction of the rotor.

8. The pole shoe element as claimed in claim 1, wherein the pole shoe element extends in a longitudinal direction that is mounted in a machine element and is arranged obliquely with respect to an axis of rotation of the rotor.

9. The pole shoe element as claimed in claim 1, wherein the electrical machine comprises a machine element forming the rotor or the stator, wherein the machine element comprises a plurality of pole shoe elements, and wherein two of the pole shoe elements are opposite to one another respectively and are arranged in a peripheral direction of the rotor at a distance from one another so that a depression for receiving a magnet assembly is formed directly between the two of the pole shoe elements.

10. An electrical machine, comprising:
    a rotor; and
    a stator,
    wherein the rotor or the stator is formed by a machine element comprising a pole shoe element as claimed in claim 1.

11. The electrical machine as claimed in claim 10, further comprising at least one permanent magnet.

12. The electrical machine as claimed in claim 11, wherein the permanent magnet is a ferrite magnet.

13. The electrical machine as claimed in claim 10, wherein the electrical machine is a generator of a wind turbine.

14. A wind turbine, comprising:
    an electrical machine as claimed in claim 10.

* * * * *